(12) United States Patent
Khalid

(10) Patent No.: US 6,231,306 B1
(45) Date of Patent: May 15, 2001

(54) CONTROL SYSTEM FOR PREVENTING COMPRESSOR STALL

(75) Inventor: Syed J. Khalid, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/197,864

(22) Filed: Nov. 23, 1998

(51) Int. Cl.[7] ..................................................... F02C 9/18
(52) U.S. Cl. ................... 416/26; 415/49; 415/118
(58) Field of Search .................. 415/17, 26, 28, 415/47, 48, 49, 50, 118; 701/101; 60/39.29, 39.27

(56) References Cited

U.S. PATENT DOCUMENTS

| | | | |
|---|---|---|---|
| 3,852,958 | 12/1974 | Adams et al. | 60/39.28 R |
| 4,083,235 | 4/1978 | Gallant | 73/117.3 |
| 4,117,668 | 10/1978 | Elsaesser et al. | 60/39.03 |
| 4,196,472 | 4/1980 | Ludwig et al. | 364/431 |
| 4,608,860 | 9/1986 | Charrier et al. | 73/115 |
| 4,618,856 | 10/1986 | Antonazzi | 340/626 |
| 4,949,276 | 8/1990 | Staroselsky et al. | 364/509 |
| 5,165,844 | 11/1992 | Khalid | 415/17 |
| 5,165,845 | 11/1992 | Khalid | 415/17 |
| 5,375,412 | 12/1994 | Khalid et al. | 60/39.29 |
| 5,385,012 | * 1/1995 | Rowe | 60/39.02 |
| 5,448,881 | * 9/1995 | Patterson et al. | 60/39.29 |
| 5,594,665 | * 1/1997 | Walter et al. | 364/558 |

* cited by examiner

*Primary Examiner*—Edward K. Look
*Assistant Examiner*—James M McAleenan
(74) *Attorney, Agent, or Firm*—McCormick, Paulding & Huber LLP

(57) ABSTRACT

A control system for preventing a compressor stall in a gas turbine engine includes means for sensing an aerodynamic signal indicative of an impending stall condition. The weak stages of the compressor amplify an upstream disturbance originating in the low pressure compressor or fan, resulting in a discrete frequency disturbance, which is an effective stall precursor. The control system also includes means, responsive to the sensed signal, for processing the signal by isolating the relevant frequencies of the sensed signal, calculating the magnitude of the relevant portions of the sensed signal, comparing the sensed signal to a predetermined threshold indicative of a healthy compressor, and for providing a processed signal indicative of an impending stall condition. The control system further includes means, responsive to the processed signal, for providing an output to initiate corrective action to prevent the impending stall condition. The engine's electronic control system, in response to the output signal, increases the stall margin by either adjusting the compressor variable vanes or modulating the compressor bleed.

9 Claims, 1 Drawing Sheet

CONTROL SYSTEM FOR PREVENTING COMPRESSOR STALL

TECHNICAL FIELD

This invention relates to the control of gas turbine compressors and more particularly to a control system for detecting and preventing an impending compressor stall.

BACKGROUND ART

The phenomenon of compressor stall has become an important limiting factor in the operation of gas turbine engines as their performance characteristics have improved. In modern gas turbine engines, upon acceleration or under high altitude and lower speed flight conditions, unstable flow may develop in the compressor which can lead to a stall with a resultant increase in turbine temperature and mechanical vibration along with a simultaneous reduction in cooling air supplied to the turbine wheel. These conditions describe "compressor stall" and can lead to turbine failure if the compressor stall is not recognized and corrective action not taken. Turbine failure during engine operation can lead to severe engine and aircraft damage.

To avoid such damage, control systems have been proposed to detect the onset of compressor stall and either signal the aircraft pilot or automatically compensate to bring the engine out of the stall condition. It has been found that functions of certain engine operating parameters can provide an indication of stalled engine conditions. Systems have been designed which monitor these parameters to detect compressor stall. Several previous attempts to develop stall warning indicators have used either engine operating pressures, pressure ratios, speed or temperatures as input parameters.

DISCLOSURE OF THE INVENTION

A primary object of the present invention is the provision of a control system for preventing a compressor stall.

A further object of the present invention is the provision of such a control system for preventing stall that uses only one sensed compressor pressure parameter to determine an impending stall condition.

Another object of the present invention is the provision of a control system, that does not unnecessarily increase the compressor stall margin and thereby negatively effect engine efficiency.

The present invention is predicated on the fact that low pressure compressor disturbances occur at different engine operating conditions. However, the low pressure compressor or fan disturbances are detrimental only if amplified by deteriorated compressor stages that have been adversely affected as they have large tip clearances. The present invention utilizes a signal indicative of the amplified low pressure compressor or fan disturbance to predict an impending stall. Thus, the present invention is designed to predict an impending stall and maintain an adequate compressor stall margin.

According to the present invention, a control system for preventing a compressor stall includes means for sensing a signal indicative of compressor pressure, which signal has a frequency that is a function of the fan or low pressure compressor speed. The control system also includes means for processing the sensed pressure signal by: (1) isolating the relevant frequencies of the sensed signal; (2) calculating the magnitude of the relevant frequency portions of the sensed signal; and (3) comparing the sensed signal to a predetermined threshold indicative of a healthy compressor. The control system also provides a processed signal indicative of an impending stall condition. The control system further includes means, responsive to the processed signal, for providing an output signal to initiate corrective action to prevent the impending stall condition. For example, the engine control means which is a part of the control system, in response to the output signal, increases stall margin by either adjusting the compressor variable airflow geometry or by modulating the compressor bleed valve.

The present invention has utility in that it allows for an indication of an impending stall condition sufficiently in advance such that corrective action may then be taken to prevent the stall from occurring. The present invention is simple to implement as it uses only one sensed engine operating parameter to indicate an impending stall condition. The simplicity of the present invention allows for it to be practical for engine fleet retrofitability. Further, the present invention provides a higher relative engine efficiency because the mechanisms to increase the stall margin are not employed until required to ensure safe engine operation below the surge line. Thus, the control system results in savings in the amount of fuel consumed by the engine.

The foregoing and other objects, features and advantages of the present invention will become more apparent in the following detailed description of the best mode for carrying out the invention and from the accompanying drawings, which illustrate an embodiment of the invention.

BEST MODE FOR CARRYING OUT THE INVENTION

Figure 1:
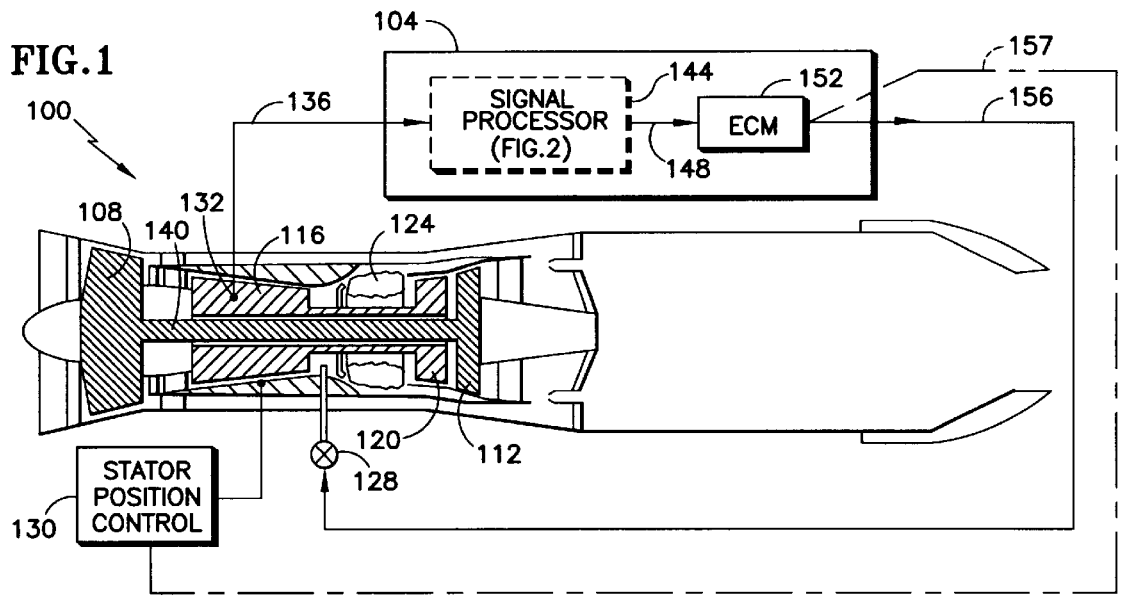
FIG. 1 is an illustration of a gas turbine engine incorporating the control system of the present invention.

Referring to FIG. 1, there illustrated is an exemplary embodiment of a known, twin-spool turbofan engine 100, together with a corresponding control system 104 having the present invention implemented therein, as described in detail hereinafter. The engine comprises a low pressure compressor 108 connected through a shaft to a low pressure turbine 112; a high pressure compressor 116 connected through a shaft to a high pressure turbine 120; and a burner section 124 disposed between the high pressure compressor 116 and high pressure turbine 120. A bleed valve 128 is disposed downstream of the high pressure compressor to discharge compressor air from the engine flow path during certain engine operating conditions. In addition, the engine has known mechanisms (not shown) to vary airflow geometry, such as compressor variable vanes which are typically movable vanes in the compressor stator which are interspersed between the rows of compressor blades. For present purposes, it is sufficient to understand that the deflection of the vanes is varied by a stator position control 130.

A high response static pressure sensor or transducer 132 is located in the high pressure compressor 116. The location of the sensor 132 is determined by experimentation to ensure that the sensor captures the signal amplified by the deteriorated compressor stages which have large tip clearances associated with unstable compressor operation, since the signal has a relatively small amplitude. Although the exact placement of the transducer will vary depending on the engine type, the transducer is preferably located interstage behind the weak stages (e.g., those stages where the tip clearances are likely to be greatest), in the casing wall where the stator is attached. The high response pressure transducer may be standard and of the type commercially available from Kulite Semiconductor Products, Inc.

The compressor static pressure on signal line 136 is an input provided to the control system 104 of the present invention. The compressor static pressure is indicative of rotational disturbances associated with the fan or low pressure compressor 140. During an impending stall condition, rotating disturbances associated with the low pressure compressor are amplified. The low pressure compressor disturbance, which by itself is benign, is caused by fan clearance asymmetry. If some stages of the high pressure compressor are weak or deteriorated, due to large tip clearances, the low pressure compressor disturbances are amplified. Test data has shown that these disturbances have a significant magnitude when tip clearances become large. Thus, the low pressure compressor disturbance, picked up by the compressor static pressure, is amplified when the compressor stall margin is low, indicating an impending stall condition. The sensed static pressure has a frequency that is a function of the low pressure compressor speed. This correlation between the magnitude of the sensed compressor static pressure and the compressor stall margin makes the signal an effective precursor of an impending stall condition.

The control system 104 of the present invention includes a signal processor 144 for processing the sensed compressor static pressure. Details of the signal processor 144 are provided hereinafter with respect to the discussion regarding FIG. 2. The output signal on line 148 is an output of the signal processor and is provided to the engine control means 152. The engine control means, in response to the output signal, increases the compressor stall margin by sending a signal on line 156 to either the compressor bleed valve or compressor variable vanes. In FIG. 1, the signal line 156 is shown as being connected to the compressor bleed valve 128. The signal line 156 may be connected to the stator position control 130 (the connection is shown as phantom 157 in FIG. 1) which modulates the deflection of the compressor variable vanes to vary airflow geometry. (the connection is shown as phantom 157 in FIG.1)

Figure 2:
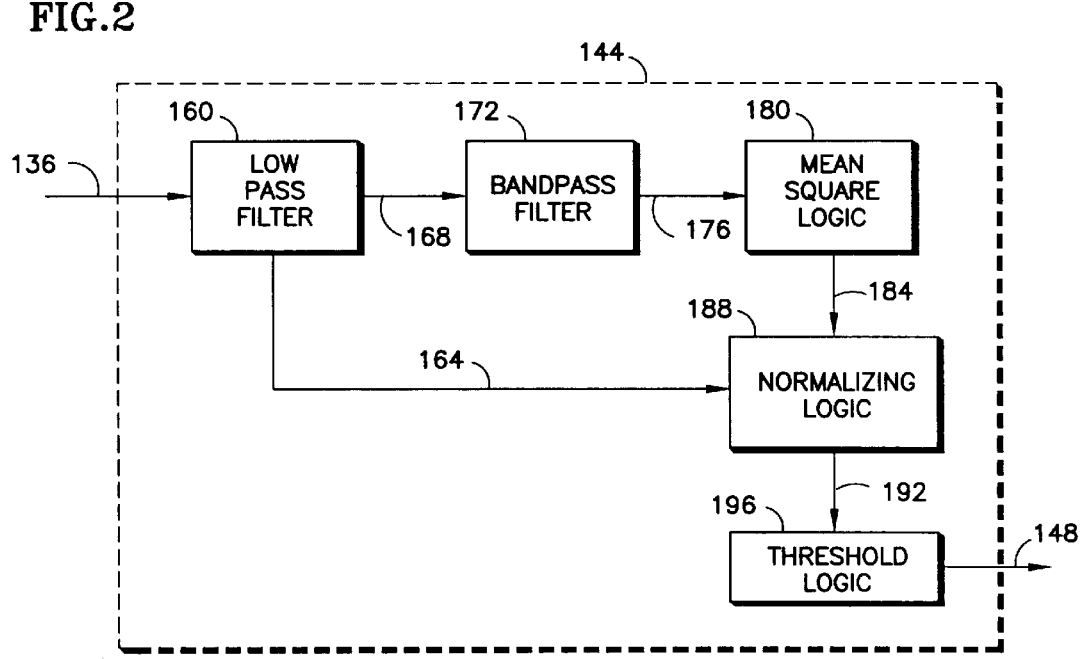
FIG. 2 is a block diagram of the signal processing logic that is a part of the control system of FIG. 1.

Illustrated in FIG. 2 is a block diagram of the signal processor 144 of the control system in accordance with an exemplary, preferred embodiment of the present invention. The signal processor 144 has only one input thereto. As described herein above, the input signal on line 136 indicative of compressor static pressure, emanates from the high pressure compressor. The sensed signal is low pass filtered in the low pass filter 160. In the preferred embodiment, a 2 Hz frequency low pass filter is used. The low pass filter removes the steady state portion,(DC pressure) of the sensed signal, which is outputted on signal line 164. The output of the low pass filter on signal line 168 is indicative of the unsteady portion (AC pressure) of the sensed pressure signal.

The output of the low pass filter on signal line 168 forms the input to a bandpass filter 172. In the preferred embodiment, a bandpass filter with a frequency range of 150 Hz to 180 Hz is used. The bandpass filter captures the frequencies related to the low pressure compressor speed. Thus, low frequency variations (which are not relevant to the low pressure compressor speed) and high frequency components such as those related to the high rotor, instrument noise and rotor blade passage effects are filtered out. The output of the bandpass filter is provided on signal line 176. All of the aforementioned inputs, logic and outputs with respect to the low pass filter 160 and bandpass filter 172 are related to a means for filtering the sensed signal and for providing a filtered signal indicative of frequencies related to the low spool rotor.

The output of the bandpass filter on signal line 176 forms the input into a mean square logic block 180. The mean square logic transforms the unsteady (AC pressure) signal to a steady (DC pressure) signal. The mean square logic calculates a mean (average) square magnitude of the pressure signal by summing the squares of the magnitude of the pressure signal sampled and dividing by the number of samples.

The output on signal line 184 of the mean square logic 180 forms an input into a normalizing logic block 188. The signal on line 164 indicative of the DC pressure of the sensed signal also forms an input into the normalizing logic block 188. The mean square signal on line 184 is divided by the DC signal on line 164 to result in the output on signal line 192 of the normalizing logic block.

The output on signal line 192 of the normalizing logic block forms an input into a threshold logic block 196. The value on signal line 192 is compared to a threshold value indicative of a healthy compressor. The threshold value is determined by statistical analysis and varies for different engine types.

If the value on signal line 192 is greater than the threshold, then the threshold logic 196 outputs a processed signal on signal line 148. This processed signal on signal line 148 is an input to the engine control means 152. The engine control means processes the processed signal on signal line 148 to produce an output command on signal line 156 that triggers the modulation of the compressor bleed valve 128 to increase stall margin. In the alternative, the output command on signal line 156 may trigger the correction of the variable airflow geometry using the stator position control 130 of the compressor to increase stall margin.

The stall precursor having a frequency of the low pressure compressor speed, disappears as soon as the variable geometry is adjusted or the compressor bleed valve is modulated. Thus, even if the stall condition has been corrected, the stator vanes or the compressor bleed valve position are not immediately returned to the nominal position. The engine control means returns the stator vanes or the compressor bleed valve to a nominal position when the pre-existing tip clearance synthesis logic of the engine control means indicates that the tip clearance overshoot is significantly reduced. Typically, it takes a time period of approximately two to three minutes for the tip clearance overshoot to reduce to a more acceptable limit and for the compressor to return to nominal operation.

The control system for preventing compressor stall according to the present invention may be implemented in a variety of ways. As described hereinbefore, the control system of the present invention may utilize digital engine controls. Alternatively, the invention may be implemented in a dedicated microprocessor separate from the engine control. Whenever a microprocessor or the like is used for implementing the invention, such as in a digital engine control, the invention may be implemented in software therein. The invention can be implemented using hardwired logic or analog circuitry.

Further, the control system of the present invention has been described using particular static pressure input signals from sensors or transducers located at particular aft stage locations in the high pressure compressor. However, this is purely exemplary; the control system can be operated with static pressure input parameters sensed by transducers located at different locations in the high pressure compressor. Further, the specific components described and illustrated for carrying out the specific functions of the control system of the present invention are purely exemplary, it is to be understood that other components may be utilized in light of the teachings herein. Such components should be obvious to one of ordinary skill in the art.

The calculations and logic illustrated for carrying out the control system of the present invention are purely exemplary. Other logic can be utilized in light of the teachings herein. The signal processing means of the present invention has been described as having filtering means, calculation means for determining the magnitude of the relevant frequency portions of the sensed signal, and comparison means to determine if corrective action is required to prevent an impending stall condition. The filtering means have been described to include low pass filtering means and bandpass filtering means. It is to be understood that the filtering means may be implemented using different filters to isolate relevant frequencies. Further, the calculation means have been described to include normalizing logic which divides the mean square pressure signal by the/DC pressure of the sensed signal to result in an output signal indicative of a normalized signal. It is to be understood that the normalizing of the mean square pressure signal may be possible with other engine pressure parameters such as the compressor discharge pressure.

It will be understood by those skilled in the art that the above-described limits and thresholds are experimentally derived for particular engine types. It is recognized that low pressure compressor speed may vary based on engine size and type. Therefore, the associated frequency range of the low pressure compressor may also vary based on engine type. Placement of the pressure sensors in the high pressure compressor may vary based on engine type. Different locations in the high pressure compressor may provide better sensed signal, in terms of amplitude sensitivity.

All of the foregoing changes and embodiments are representative of the preferred embodiment, it suffices for the present invention, that a control system for preventing a compressor stall includes means for sensing a signal indicative of an impending stall, means, responsive to the sensed signal, for processing the signal by isolating the relevant frequencies of the sensed signal, calculating the magnitude of the relevant portions of the sensed signal, comparing the sensed signal to a predetermined threshold indicative of a healthy compressor, and for providing a processed signal indicative of an impending stall condition, and the control system further includes means, responsive to the processed signal, for providing an output to initiate corrective action to prevent the impending stall condition.

Although the invention has been shown and described with respect to detailed embodiments thereof, it should be understood by those skilled in the art that various changes in form and in detail thereof may be made without departing from the spirit and the scope of the claimed invention.

What is claimed is:

1. A control system for providing an indication of an impending compressor stall in a gas turbine engine having a low pressure compressor and a high pressure compressor, comprising:

input means for sensing and providing a sensed signal indicative of the high pressure compressor static pressure in response to low pressure compressor disturbances;

signal processing means, responsive to the sensed signal, for processing the sensed signal by isolating the relevant frequencies of the sensed signal, calculating the magnitude of the relevant frequency portions of the sensed signal and comparing the sensed signal to a predetermined threshold indicative of a healthy compressor, and for providing a processed signal indicative of an impending stall condition.

2. The control system as described in claim 1, further includes output means, responsive to the processed signal, for providing an output signal to initiate corrective action to prevent the impending stall condition.

3. The control system as described in claim 2, further includes an engine control means, responsive to the output signal, for modifying engine airflow geometry to increase compressor stall margin.

4. The control system as described in claim 2, further includes a compressor bleed valve and an engine control means, responsive to the output signal, for modulating the compressor bleed valve to increase compressor stall margin.

5. The control system as described in claim 1, wherein said signal processing means processes the sensed signal to isolate the relevant frequencies by filtering the sensed signal and providing a filtered signal indicative of frequencies related to the low pressure compressor.

6. A control system for providing an indication of an impending compressor stall in a gas turbine engine having a low pressure compressor and a high pressure compressor, comprising:

input means for sensing and providing a sensed signal indicative of the high pressure compressor static pressure in response to low pressure compressor disturbances;

signal processing means, responsive to the sensed signal, for processing the sensed signal by isolating the relevant frequencies of the sensed signal, calculating the magnitude of the relevant frequency portions of the sensed signal and comparing the sensed signal to a predetermined threshold indicative of a healthy compressor, and for providing a processed signal indicative of an impending stall condition;

wherein said signal processing means calculates the magnitude of the relevant frequency portions of the sensed signal by calculating the mean square magnitude of the filtered signal, and by normalizing the mean square signal, and providing a normalized signal.

7. The control system as described claim 6, wherein said signal processing means compares the sensed signal to a predetermined threshold to determine if corrective action is required to prevent the impending stall condition, by comparing the normalized signal to a threshold value indicative of an impending stall condition.

8. The control system as described in claim 5, wherein filtering of the sensed signal further includes low-pass filtering means for providing a signal having frequency components indicative of the unsteady portion of the sensed pressure signal.

9. The control system as described in claim 5, wherein filtering of the sensed signal further includes bandpass filtering means for providing a signal having frequency components indicative of the low pressure compressor disturbances.

* * * * *